United States Patent
Choi

(10) Patent No.: US 7,242,928 B2
(45) Date of Patent: Jul. 10, 2007

(54) APPARATUS AND METHOD FOR ESTABLISHING NETWORK USING NETWORK INTERFACE

(75) Inventor: Dang Woo Choi, Osan-si (KR)

(73) Assignee: LG Electronics, Inc., Seoul (KR)

( * ) Notice: Subject to any disclaimer, the term of this patent is extended or adjusted under 35 U.S.C. 154(b) by 74 days.

(21) Appl. No.: 11/106,531

(22) Filed: Apr. 15, 2005

(65) Prior Publication Data

US 2006/0030321 A1    Feb. 9, 2006

(30) Foreign Application Priority Data

Jul. 20, 2004    (KR)    ...................... 10-2004-0056323

(51) Int. Cl.
*H04M 3/00* (2006.01)
(52) U.S. Cl. ................ 455/418; 455/552.1; 455/426.1; 370/395.42; 370/412
(58) Field of Classification Search ................ 455/418, 455/41.2, 552.1, 426.1; 370/395.42, 412
See application file for complete search history.

(56) References Cited

U.S. PATENT DOCUMENTS 7,054,634 B2 *    5/2006    Watanabe et al. ........... 455/440

2003/0133457 A1 *    7/2003    Ono et al. ............... 370/395.4
2004/0110530 A1 *    6/2004    Alone et al. ............. 455/552.1
2005/0025105 A1 *    2/2005    Rue .......................... 370/338
2005/0059420 A1 *    3/2005    Salokannel et al. ......... 455/522

FOREIGN PATENT DOCUMENTS

JP    2003-091467    *    3/2003

* cited by examiner

*Primary Examiner*—Danh Le
(74) *Attorney, Agent, or Firm*—Birch, Stewart, Kolasch & Birch, LLP

(57) ABSTRACT

A method and apparatus are provided for establishing a network using a WZCSVC program without any collision. The method includes connecting to one of a plurality of wireless networks according to a predetermined order using information on the plurality of wireless networks; receiving a request for a connection to a new wireless network; suspending a wireless service in response to the request; and processing the request upon the suspension of the wireless service.

16 Claims, 8 Drawing Sheets

APPARATUS AND METHOD FOR ESTABLISHING NETWORK USING NETWORK INTERFACE

This application claims the priority benefit of Patent Application No. 10-2004-056323 filed on Jul. 20, 2004 in Republic of Korea, which is hereby incorporated by reference.

BACKGROUND OF THE INVENTION

1. Field of the Invention

The present invention relates to a wireless network established using a WZCSVC (Wireless Zero Configuration Service) program activated on Windows® operating system and other wireless configuration utility, without any collisions.

2. Discussion of the Related Art

Once the wireless network establishing/restoring function of the WZCSVC establishes a particular network connection, conventional wireless network related utilities need to deactivate the Windows basic wireless network management function WZCSVC to select a different network connection. This prevents collision when the network access attempts are made. That is, conventional wireless network related utilities describe a method of deactivating the WZCSVC manually to change a selection of network information, and assure the operations only in the deactivated state of the WZCSVC.

In general, a network access establishment and operation in the state that the conventional WZCSVC is activated are as follows.

A network established using the WZCSVC by a user is displayed in a WZCSVC window as shown in FIG. 1a. In FIG. 1a, for example, an AP (Access Point) network information is displayed such as 3Com (18), hap80211 (19), PCDQA_CISCO (20), and its registry information is recorded in the order of Static#0000, Static#0001, Static#0002 in the Windows registry. Here, Static#0000, Static#0001 and Static#0002 represent names of registry entries in the Windows registry and are assigned to the network names 18, 19 and 20, respectively, to store therein the network information. According to the order of Static#0000, Static#0001 and Static#0002 . . . , access attempt is made in the order of the networks 18, 19 and 20.

Accordingly, when a network access attempt is made, a network establishing operation is repeatedly performed by the WZCSVC according to the priority order as displayed in FIG. 1a.

However, in case of the above operation, when a user attempts to access a network, which is recorded in the WZCSVC registry but has a low priority order, or which is not recorded in the WZCSVC registry, a collision occurs between the utility command for such access attempt and the network access command of the WZCSVC (which already established the network to be connected to), because both attempts are made continuously at the same time.

For example, in the state that the already established network is set as 3Com (18) (i.e., Static#0000 in the registry) by the WZCSVC, and if hap80211 (19) (i.e., Static#0001 in the registry) is selected manually for access, then access collision occurs since the WZCSVC is still activated and attempts to access 3Com.

SUMMARY OF THE INVENTION

An object of the invention is to provide an apparatus, method and computer program for establishing a network in the state that a WZCSVC is activated, without any collision among the network access attempts.

According to an aspect of the present invention, it is required to preferentially perform the access attempted by the network, regardless of the already established network and the access priority orders, by modifying the NDIS (Network Driver Interface Specification) intermediate driver as a network driver and the information of a WZCSVC.

In order to achieve the above-described and other objects of the present invention, there is provided an apparatus for establishing a network using a network interface which includes a kernel part including one or more running processes, the apparatus comprising: a service part for supporting and managing one or more wireless networks; an operation part for operating the service part and performing at least one ore more data sends/receives on the basis of a predetermined rule; a miniport driver part for interchanging information sent and received between the service part and the network; a network driver, connected with the service part, the mini-port driver part and an application for performing the interface among the configuration, for storing the information of the newly access attempting network and adjusting the access priority order, if a newly access attempting network does not exist in a predetermined list for one or more networks as set.

Also, there is provided a method for establishing a network using a network interface in a network establishment apparatus having a kernel part with a service part, a network driver and a LAN and an application corresponding to a user area, the method comprising the steps of: requesting a network establishment at a protocol part corresponding to one or more service parts; processing a pending network process to verify the application whether or not to proceed in response to the establishment request at an IM driver functioning as a network drive; identifying a WZCSVC registry as a service part on the basis of an application event establishment; if the network requested to be established exists in the registry, verifying whether the profile of the requested network exists and/or whether the network function is activated; and if it is determined that the profile of the requested network exists and the network function is activated as a result of the verification, establishing a connection after stopping the WZCSVC as the service part to establish the connection with the requested network.

According to an aspect of the present invention, it is possible to share the WZCSVC and the wireless network control.

Also, it is possible to establish a network, without any collisions among the access attempted networks, in the state that the WZCSVC is activated.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present an apparatus and method for establishing a network using a network interface according to the preferred embodiment(s) of the invention in reference to the accompanying drawings.

First of all, the operation features of the present invention will be described as follows in reference to FIGS. 1b and 9.

1. Operational Feature of WZCSVC and Method of Detecting Collision.

At a NDIS Intermediate (IM) driver level, a subject requesting a NDIS (a high driver) is not known. For this reason, the WZCSVC should be distinguished from other protocol drivers according to the following features of an operation:

After performing a set request for a mini port driver part to be connected to an OID_802_11_SSID (Service Set Identification), a WZCSVC queries what is connected at present by an initial OID_802_11_SSID Query Request when a connect event occurs. The OID is a control code which stands for an object identifier.

After querying what is connected at present by OID_802_11_SSID Query Request after performing Suspend/Resume functions, OID_802_11_SSID set is performed.

2. Method of Distinguishing a Protocol Driver Having the Same Operation as the WZCSVC and Solution of Collisions (1) The WZCSVC processes a pending request and establishes an application share event in order to verify whether a corresponding request is processed or not in the IM driver by the application when an OID_802_11_SSID set request occurs.

(2) In an application, after detecting the WZCSVC's wireless network contents establishment, if necessary for example, in order to establish a network as a WZCSVC registry entry and a newly requested AP, the WZCSVC is stopped for a certain duration of time, and then the pending request is performed. Upon completion of the request, a connect event is generated in the mini port driver part.

If the WZCSVC is stopped by establishing the event of the application, thereafter the WZCSVC is re-started. The re-started WZCSVC performs an OID_802_11_SSID Query and returns a Fake SSID (NULL) to restore the WZCSVC registry information. The WZCSVC performs an OID_802_11 SSID (Set).

If the OID_802_11_SSID (Set) is generated, the above process is repeatedly performed.

Figure 1A:
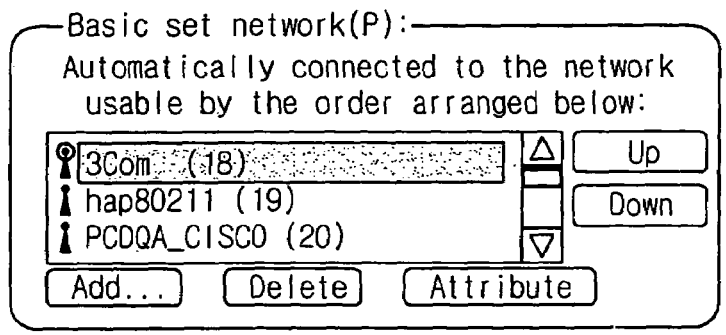
FIG. 1a shows that a network established by a user is displayed on a WZCSVC window according to a related art.
Figure 1B:
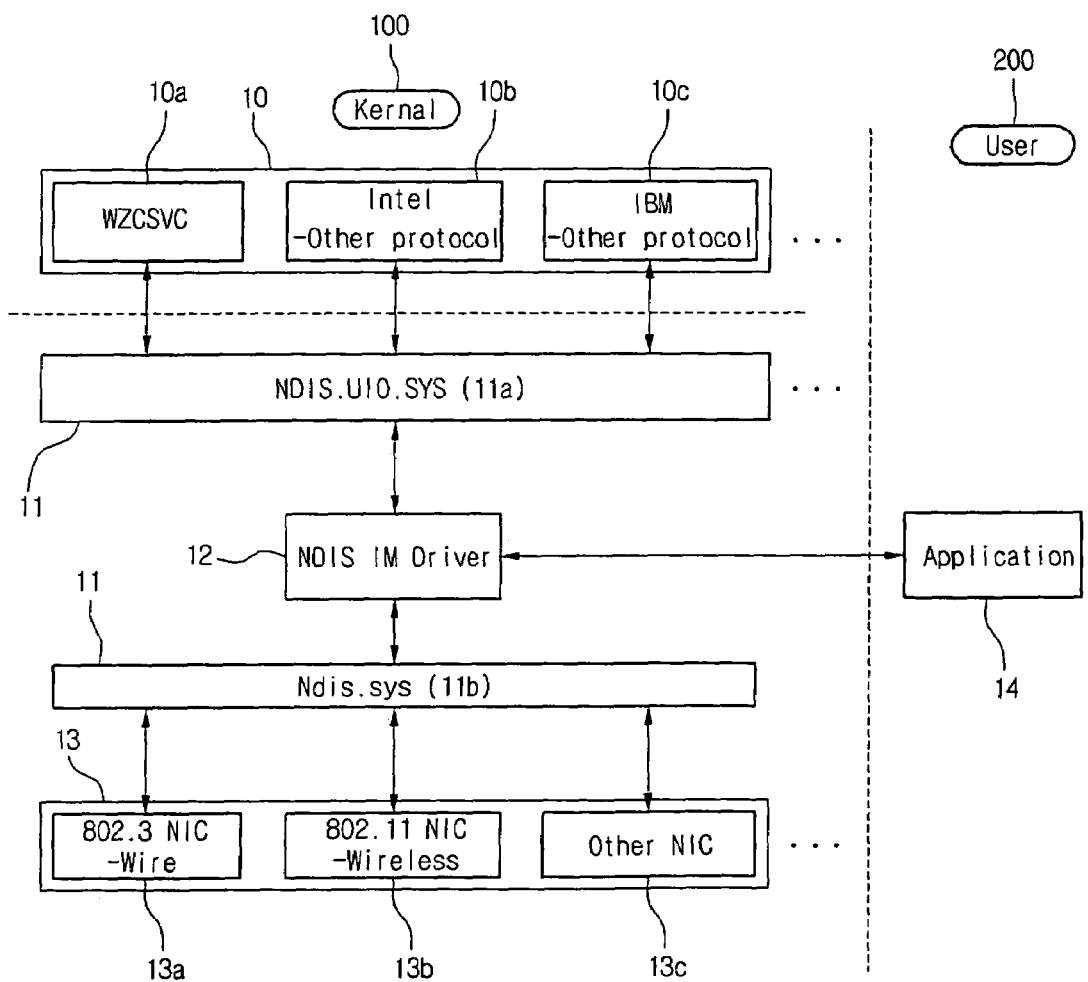
FIG. 1b shows an apparatus configuration including a NDIS IM driver and an application according to an embodiment of the present invention.

FIG. 1b shows an apparatus configuration including a NDIS IM driver and an application according to an embodiment of the present invention. As shown in FIG. 1b, the apparatus comprises a kernel part 100 including one or more executing processes and an application 14 which is a user part 200 to be connected to a NDIS IM driver 12 as a network driver. All the components of the apparatus are operatively coupled.

The kernel part 100 includes a service part 10 for performing at least one or more network establishment requests and management; an operation part 11 for performing at least one or more operations between the service part 10 and a NDIS IM (Network Driver Interface Specification Intermediate) driver 12, and data send/receive operations on the basis of a predetermined rule, the operation being included in the Operating System (OS) such as NDIS.SYS; a mini port driver part 13 for interchanging information as sent and received between the service part 10 and the network; and the NDIS IM driver 12 as a network driver, which is connected between the service part 10 and the mini port driver part 13, performs the interface between the configurations, stores the information of the newly access-attempted network and adjusts the access priority order, if the network access attempt by the priority order or as new does not exist in the already established list for one or more established networks.

The service part 10 includes an Intel protocol 10b and an IBM protocol 10c and a WZCSVC 10a for managing one or more wireless networks.

The operation part 11 includes a NDIS.SYS file 11a necessary for the WZCSVC system operation, a NDIS.SYS file 11b and any of the protocol for enabling the operation between the systems to be compatible.

The mini port driver part 13 includes the drivers such as a wire LAN card 802.3 NIC 13a, a wireless LAN card 802.11 NIC 13b, and other LAN card(s) 13c.

A general operation of a conventional network system is as follows.

1.Operation Contents of WZCSVC in Case of Activating WZCSVC (1) If a WZCSVC is activated and a wireless network established by a user does not exist in the WZCSVC registry, the WZCSVC performs a link speed query at 250 ms intervals and a BSSID (Basic Service Set Identification) query at one minute intervals to attempt access the user-selected network.

(2) If a connect event occurs, the information of the connected wireless network is displayed.

(3) If the wireless network established by the user exists in the WZCSVC registry and the connect event occurs, the wireless network AP requested to be connected at present is searched. If the contents of the requested network AP are different from the contents established by the user, a forced establishment repetition is performed by the wireless network existing in the registry, setting the priority to the WZCSVC. Then a collision with a network command requesting the present establishment occurs.

(4) If the disconnect occurs, the network establishment attempt is applied to one's own network as connected before or to other existing wireless networks as established. For example, if the already established network is set as Static#0000 for 3Com as shown in FIG. 1a, and if the user attempts to access hap80211, (Static#0001 in the registry) or another AP, or the disconnect occurs, then collision occurs because of the WZCSVC. The present invention solves this problem.

Figure 2:
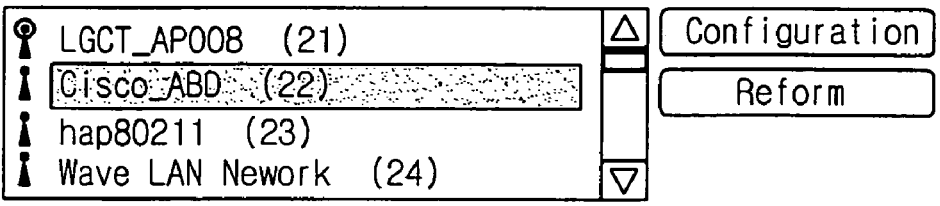
FIG. 2 shows an example of a list of networks searched for a network configuration according to the present invention.

FIG. 2 shows a list of networks as searched for a network configuration. As shown in FIG. 2, LGCT_AP008 (21), Cisco_ABD (22), hap80211 (23) and WaveLAN Network (24) are searched.

Figure 3:
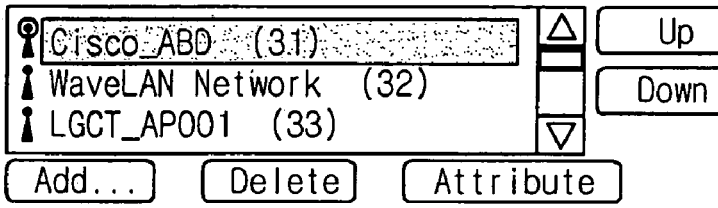
FIG. 3 shows an example of a network basically set by a user among the list searched in FIG. 2.

FIG. 3 shows a network establishment performed among the list of the networks searched as in FIG. 2, according to the user's establishment or selection of priority order.

As shown in FIG. 3, if the network connect event occurs, access attempts are made in the order of Cisco_ABD 31, WaveLAN Network 32 and then LGCT_AP008 33.

Figure 4:
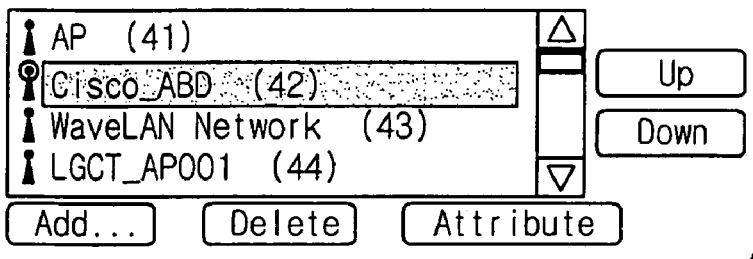
FIG. 4 shows an example of the order of networks in which a new AP network, not existed in the list of FIG. 3, is re-established by the application of a user when a connect event occurs in the network establishment according to the order of FIG. 3 according to the present invention.

FIG. 4 shows an order of the network re-established by an application when a new AP network (41) not existed in FIG. 3 is added, according to the present invention.

As shown in FIG. 4, if a network connect event occurs, the present invention automatically reconfigures the access attempt order such that the system attempts to access AP 41, Cisco_ABD 42, Wave LAN Network 43 and then LGCT_AP001 44 in that order to get a network connection.

Figure 5:
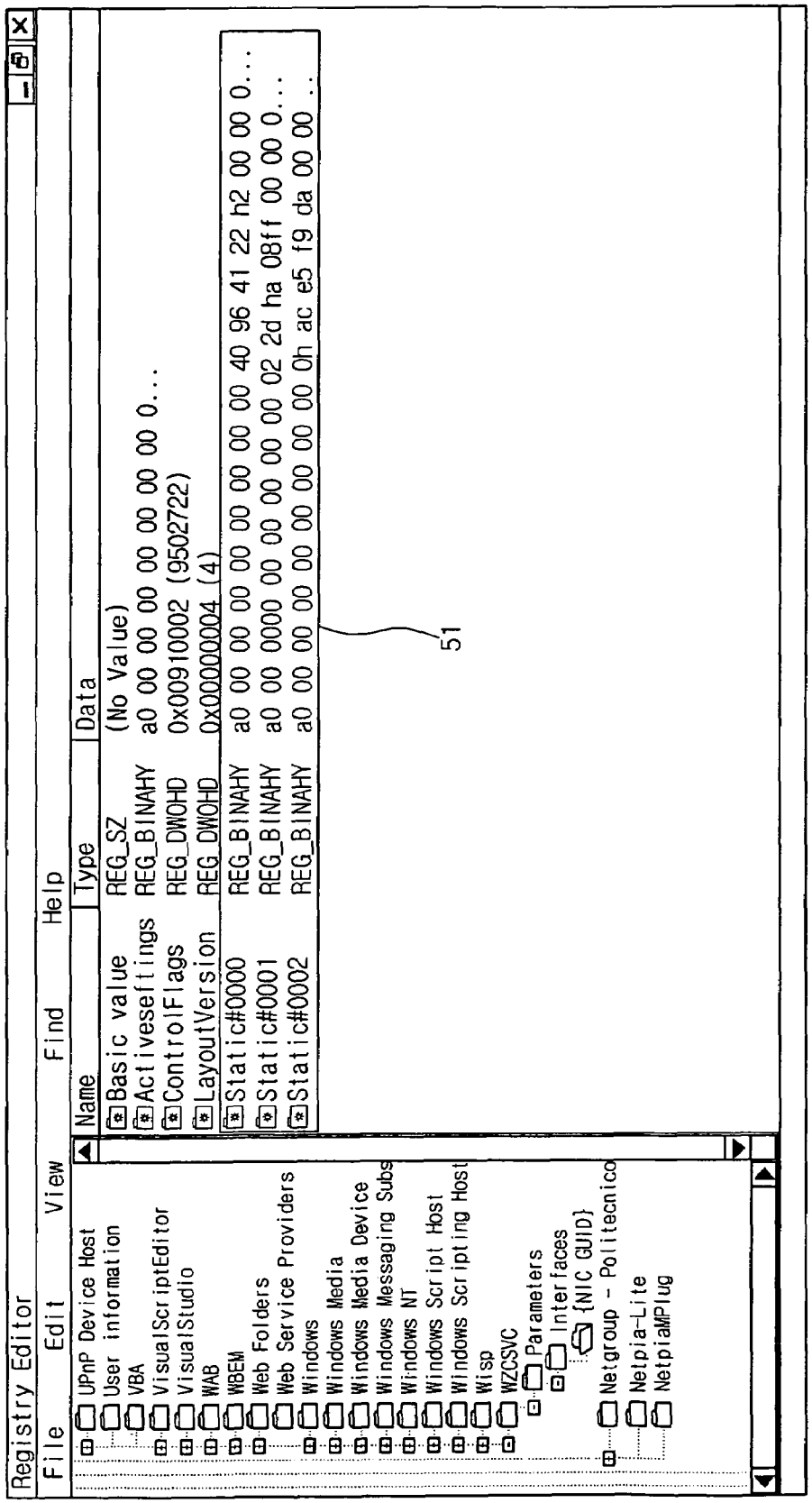
FIG. 5 shows an example of a screen image as stored in a WZCSVC registry according to the present invention.

For the network as established above, the WZCSVC stores its own network list (for example, Static#0000,0001, 0002) 51 in the registry of the window as shown in FIG. 5, which depicts a screen window having the file address of:

HKEY_LOCAL_MACHINE\SOFTWARE\Microsoft\WZCSVC\Parameters\Interfaces\{NIC GUID}\.

In accordance with the order of the established wireless networks, Static#0000, Static#0001, Static#0002 and Static#0003 are stored in turn.

In the example of FIG. 4, AP is stored for Static#0000, Cisco_ABD is for Static #0001, and WaveLAN Network for Static#0002 and, LGCT_AP008 for Static#0003 (not shown), by their respective information. Here, the new AP network 41 has the highest priority for network access attempts.

The controlflag value of the network established above is as follows:

ControlFlags Value: 32 Bits * for example,

| 0 | 1 | 9 | 1 | 8 | 0 | 0 | 2 |
|---|---|---|---|---|---|---|---|
| 0000 | 1001 | 1001 | 0001 | 1000 | 0000 | 0000 | 0010 |

The above values are stored in the WZCSVC registry. In the above, the fifteenth bit starting for the left indicates whether or not the wireless network management function of the WZCSVC is activated. For example, if the value of the fifteenth bit is 1, it indicates that the WZCSVC is activated; while if the value of the fifteenth bit is 0, it indicates that the WZCSVC is inactive or deactivated.

The twentieth bit above starting from the left indicates whether or not a profile of the wireless network established/selected by a user exists, e.g., in the WZCSVC registry. For example, if the value of the twentieth bit is 1, it indicates that the profile of the wireless network established by the user exists; while if the value is 0, it indicates that the profile of the network as established does not exist.

Figure 6:
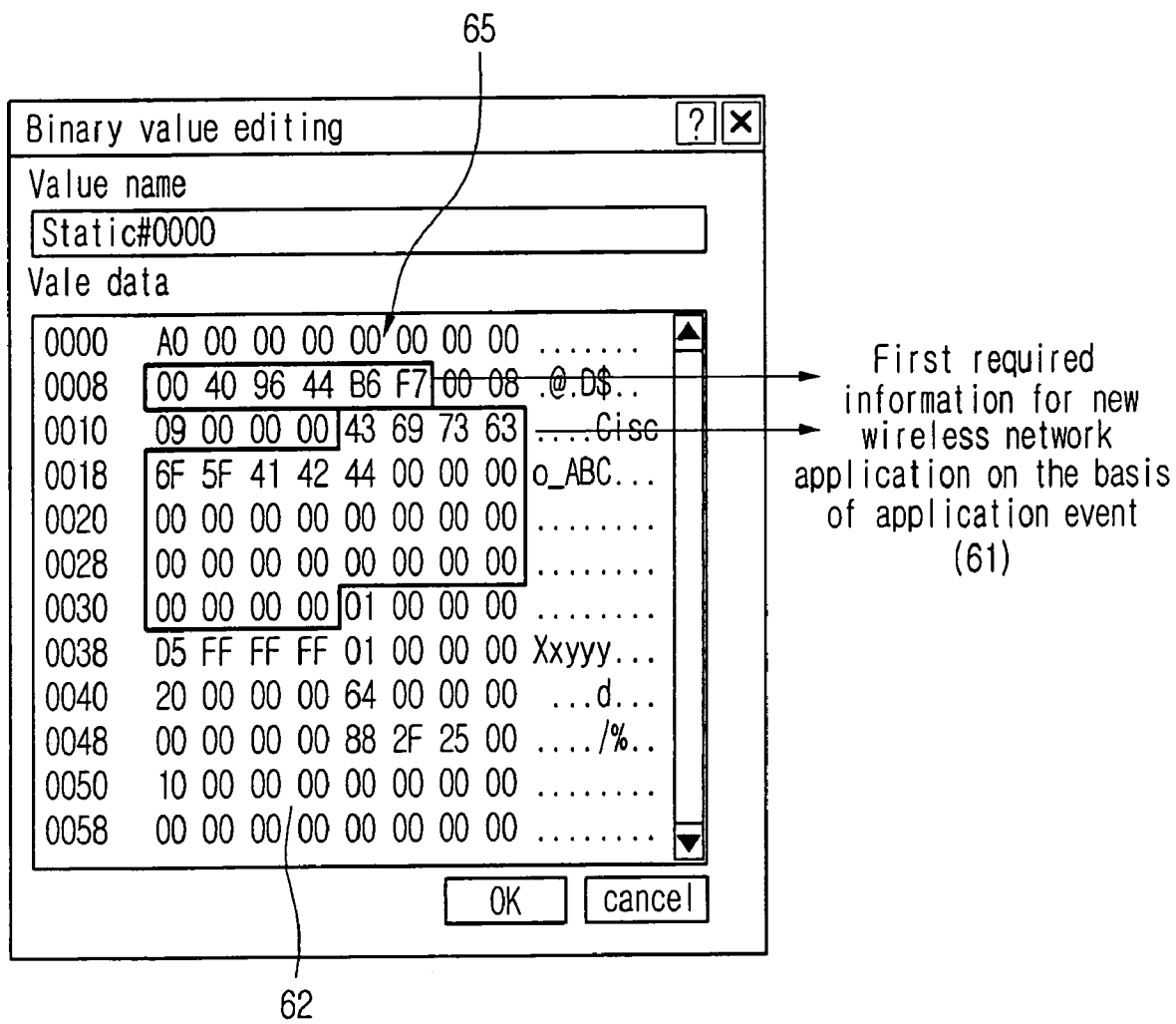
FIG. 6 shows first required hexadecimal numeral information for a new wireless network application based on an application event according to the present invention.

FIG. 6 shows an example of data 65 stored in Static#0000, this data including first required hexadecimal numeral information 61 for a new wireless network application and other data 62.

Based on the application event, the WZCSVC performs a fast application of a new wireless network by carrying out a data correction of the information 61 within a minimum information range 00h–33h as predetermined, instead of the entire data 65 regarding the new wireless network.

Since the network data is corrected or modified using only the needed information (61), when the WZCSVC is restarted and the OID_802_11_SSID (Query) querying what is the present accessed AP is performed in the IM driver, the WZCSVC needs to perform the OID_802_11_SSID (Set) once again by returning the fake SSID to restore the complete information. The remaining data of the established wireless network is automatically corrected to be matched to the format which the WZCSVC uses.

Figure 7:
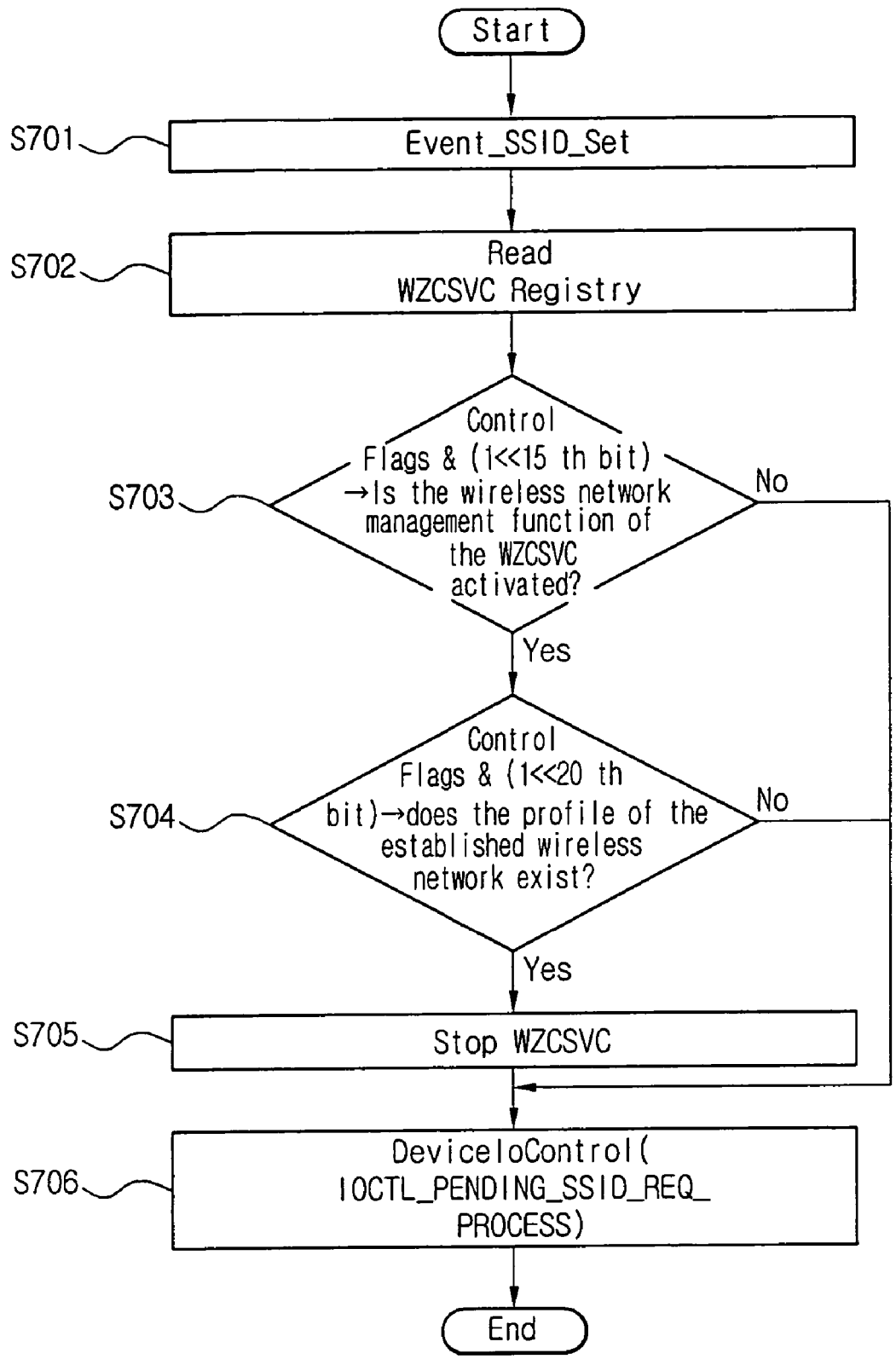
FIG. 7 is a first flow chart illustrating a method of establishing a wireless network in any one or more of a service unit, and an operation unit according to a predetermined rule according to the present invention.

FIG. 7 is a first flow chart illustrating a method to establish a wireless network in any one or more of a service unit and an operation unit according to a predetermined rule, in accordance with the present invention. The steps of FIG. 7 (and FIGS. 8–10) can be implemented in the system of FIG. 1b or in other suitable systems.

Referring to FIG. 7, when an establishment of a wireless network is requested to the NDIS IM driver 12, an event is requested to application 14 (Event_SSID_Set) (S701).

The application reads the registry of the WZCSVC(S702); determines whether or not the wireless network management function of the WZCSVC is activated by examining the fifteenth bit of the control flag value stored in the registry as discussed above (S703); and determines whether or not the profile of the requested wireless network exists by examining the twentieth bit of the control flag value (S704).

If steps S703 and S704 are satisfied (i.e., yes), then the application stops the WZCSVC being activated at present to perform the connect event to the new AP requesting the establishment at step S701 (S705).

The reason for stopping the WZCSVC is to prevent any collision with the wireless network requested to be established at present in accordance with the procedures of the wireless network already established or to identify what is the wireless network requested.

The application sends a command to connect to the AP intended to be established at step S701, to the IM driver Device_IO_Control (IOCTL_PENDING_SSID_REQ_PROCESS) (S706).

On the other hand, as a result of the determining steps S703 and S704, if it is determined that the wireless network management function of the WZCSVC is inactive or deactivated or if it is determined that the profile of the requested wireless network does not exist in the WZCSVC registry, the application sends to the IM driver a command to connect to the new AP intended to be established (as specified, at step S701), i.e., Device_IO_Control (IOCTL_PENDING_SSID_REQ_PROCESS) (S706).

That is, as shown in FIG. 7, if it is determined that the wireless network management function of the WZCSVC is activated and the wireless network profile exists by referring to the registry value of the WZCSVC, the application stops the WZCSVC for a certain time duration, requests the connect to the requested network, and requests the process of the pending network to the IM driver.

Figure 8:
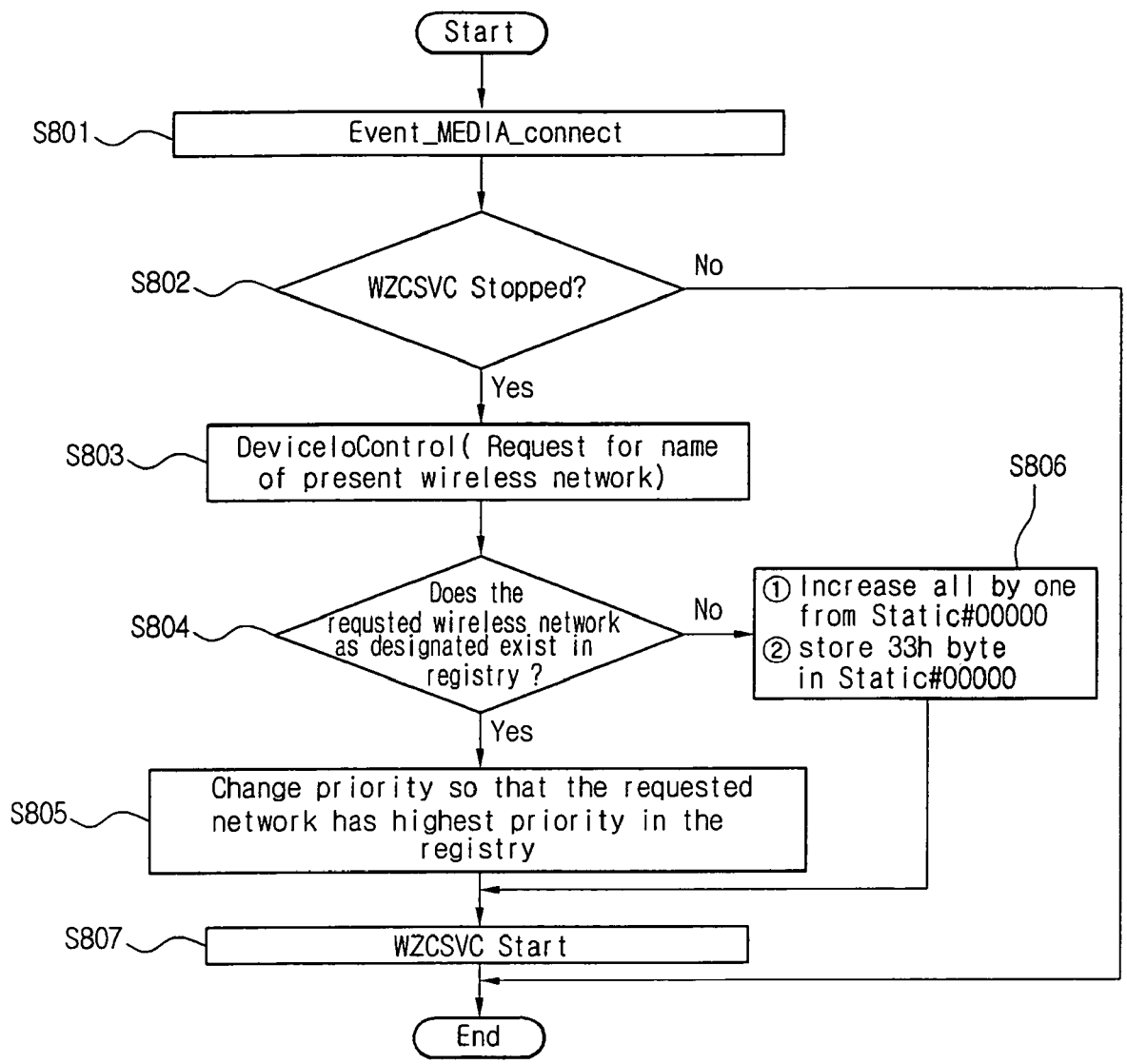
FIG. 8 is a second flow chart illustrating procedures proceeded after establishing a new wireless network in FIG. 7.

FIG. 8 is a flow chart illustrating procedures for reconfiguring automatically the WZCSVC registry. The steps of FIG. 8 can be executed in the method of FIG. 7.

Referring to FIG. 8, the connect establishment and event (Event_Media_connect) among a protocol driver 11, an IM driver 12 and an application 14 are performed (S801).

Whether the WZCSVC (which is the service part) is activated or stopped is identified based on the new network establishment request, for example, based on the values stored for Static#XXXX (S802); and if the WZCSVC is stopped, the name of the access requesting network is requested (S803). Here Static#XXXX represents the newly requested network.

Whether the requested network exists in the WZCSVC registry is identified based on the network request (S804). If the newly requested network exists in the WZCSVC registry as Static#XXXX, then the access priority of the registry entries is automatically reconfigured such that the currently requested network entry (Static#XXXX) is changed to Static #0000 having the highest access attempt priority. This can be implemented in a variety of ways. For instance, in one example, assume that Static#0005 is the currently requested network. But since its number is #0005, it has a low priority and thus the system will not attempt to access this network until other attempts fail. According to the present invention, Static#0000–#0004 are changed to Static#0001–#0005, respectively, by increasing them with one, and the old Static#0005 (currently requested network) is changed to Static#0000 so that it has now the highest priority (S805).

On the other hand, at step S804, if the network (Static#XXXX) currently requested to be established does not exist in the WZCSVC registry, all the registry values except for the network currently requested to be established are increased by 1(①), and the SSID, BSSID 33h byte information of the requested network is read and stored in Static #0000 as newly established (②) as shown in FIG. 6 (S806). In this way, Static#0000 having the highest access priority is assigned to the currently requested network and has the necessary information to attempt to access that network.

Thereafter, the WZCSVC is re-started using the stored information (S807).

When the WZCSVC is re-started using the information stored in the registry, the WZCSVC queries the network driver regarding what is the network as accessed at present OID_802_11_SSID (Query) and the IM driver transmits a fake information to the WZCSVC. At this time, the WZCSVC stores the remaining information of the established network, i.e., the information 62 other than the part 61 indicated in FIG. 6, in the registry to store the complete information 65 of the AP as connected and established.

For the WZCSVC's query to the IM driver regarding what is the AP as accessed and established at present OID_802_11_SSID (Query), the IM driver transmits the fake signal, that is, information (null) (e.g., 62 in FIG. 6) having no specific relation with the newly established AP (e.g., background information) so that the WZCSVC restores the entire information 65 for the requested network as shown in FIG. 6.

The process in FIG. 8 is explained again generally as follows.

If the WZCSVC is stopped, the name of the wireless network as accessed and established at present is requested by IoControl. If the name is already recorded in the registry of the WZCSVC, the currently requested wireless network is set as Static#0000 and the rest of the registry entries is increased by 1 to re-start the WZCSVC basically using the wireless network (Static#0000) as first designated outside. In this case, the WZCSVC queries the OID_802_11_SSID Query, receives the fake SSID and again sets the OID_802_11_SSID Set, so that the wireless network information of 33 h Byte as randomly stored is all filled by the WZCSVC. Further, the existing wireless network establishment is also maintained.

Figure 9:
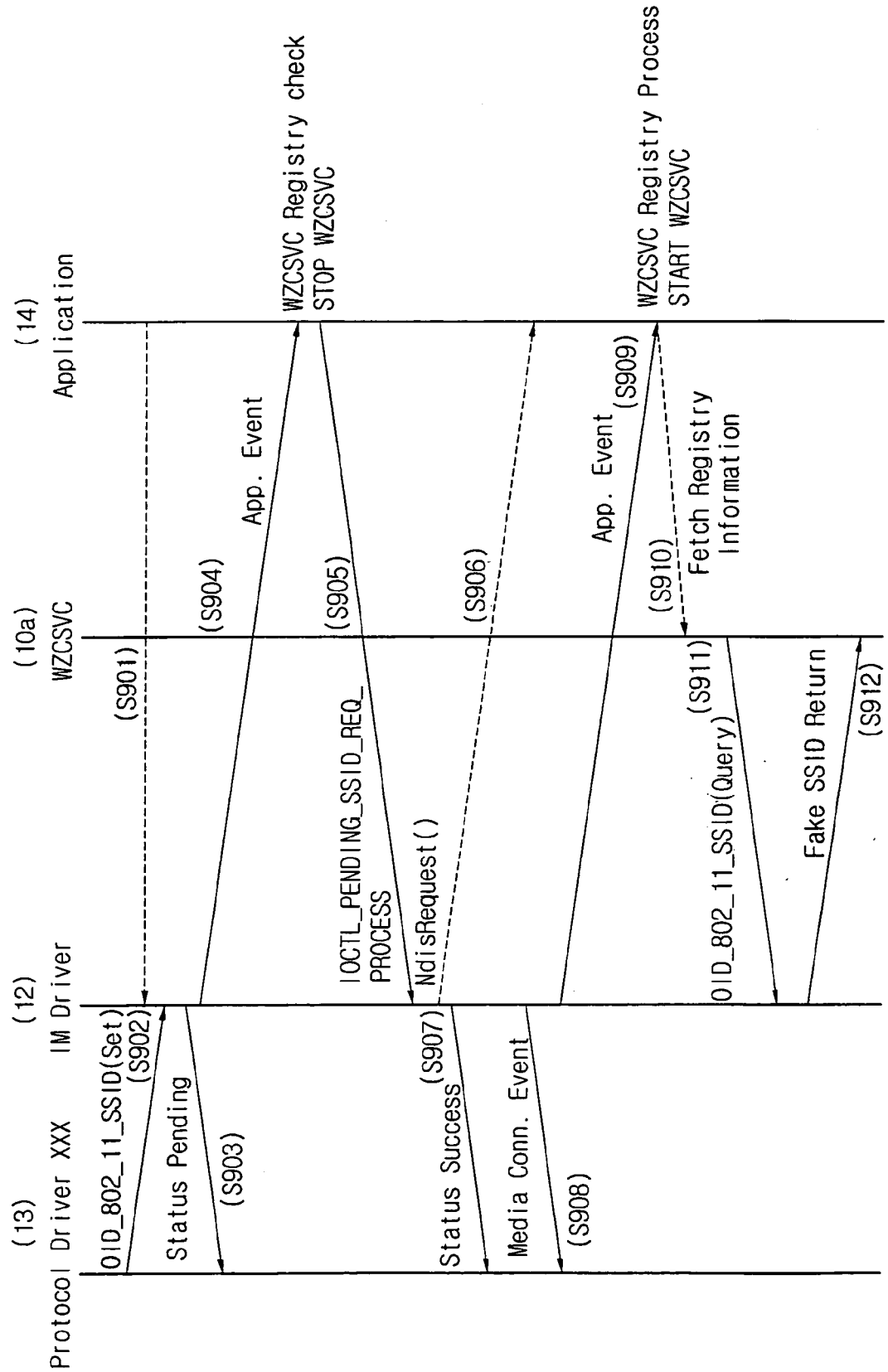
FIG. 9 is a state view that FIGS. 7 and 8 are operated at the constitutional elements of FIG. 1b.

FIG. 9 is a state view showing the steps of FIGS. 7 and 8 implemented by an apparatus, which can be the apparatus of FIG. 1b.

As shown in FIG. 9, the apparatus comprises a plurality of protocol drivers for displaying an operation part to form a kernel part, a NDIS IM driver 12 as a network driver and a service part 10, and an application 14 as a user part. A mini port driver part 13 is further included for performing the operation, and substantially the IM driver and the application share the mutual operation.

FIG. 9 is also a state view illustrating the communication procedures among the random protocol driver (13), IM driver (12), WZCSVC (10a) and application (14).

Given is the description provided that the application as the user part commands the IM driver to detect which protocol driver attempts a network connect operation (S901).

A new wireless network establishment is requested in a random protocol driver OID_802_11_SSID (Set)(S902).

Responding to this request for the new wireless network establishment, the IM driver returns a pending status and requests an application to identify the WZCSVC (S903).

If the IM driver sets an event to the application (S904), the application stops the WZCSVC for a while in order to establish a newly requested AP after identifying whether the present connected network is activated and what is the selected wireless network and performing the backup, referring to the registry of the WZCSVC as shown in FIG. 3 or FIG. 4.

The application requests the IM driver to proceed with the new wireless network by control commends IOCTL (Input Output Control) (S905).

The IM driver notifies the application of the access request of the new wireless network (S906), and performs the establishment of the pending processed wireless network. Then if the status indicates success., a media connection event occurs. Then the application is set as the event (S907, S908, S909). That is, as the new wireless network as requested to be established is completely accessed, the IM driver transmits a command to start the WZCSVC.

The application stores, in the registry of the WZCSVC, only a minimum value (65) of the SSID as displayed by the solid lines in FIG. 6 (S910).

The WZCSVC is re-started and the re-started WZCSVC queries the present accessed wireless network (S911).

Here, the IM driver returns the fake SSID (NULL) and equally processes as the fake SSID to all OID_802_11_SSID (Query) before a new OID_802_11_SSID (Set) is generated (S912). Meanwhile, if the OID_802_11_SSID (Set) requesting a new wireless network access occurs, the above process is repeatedly performed. -The operation in the above process equally works upon a new establishment of the wireless network and suspend/resume.

Figure 10:
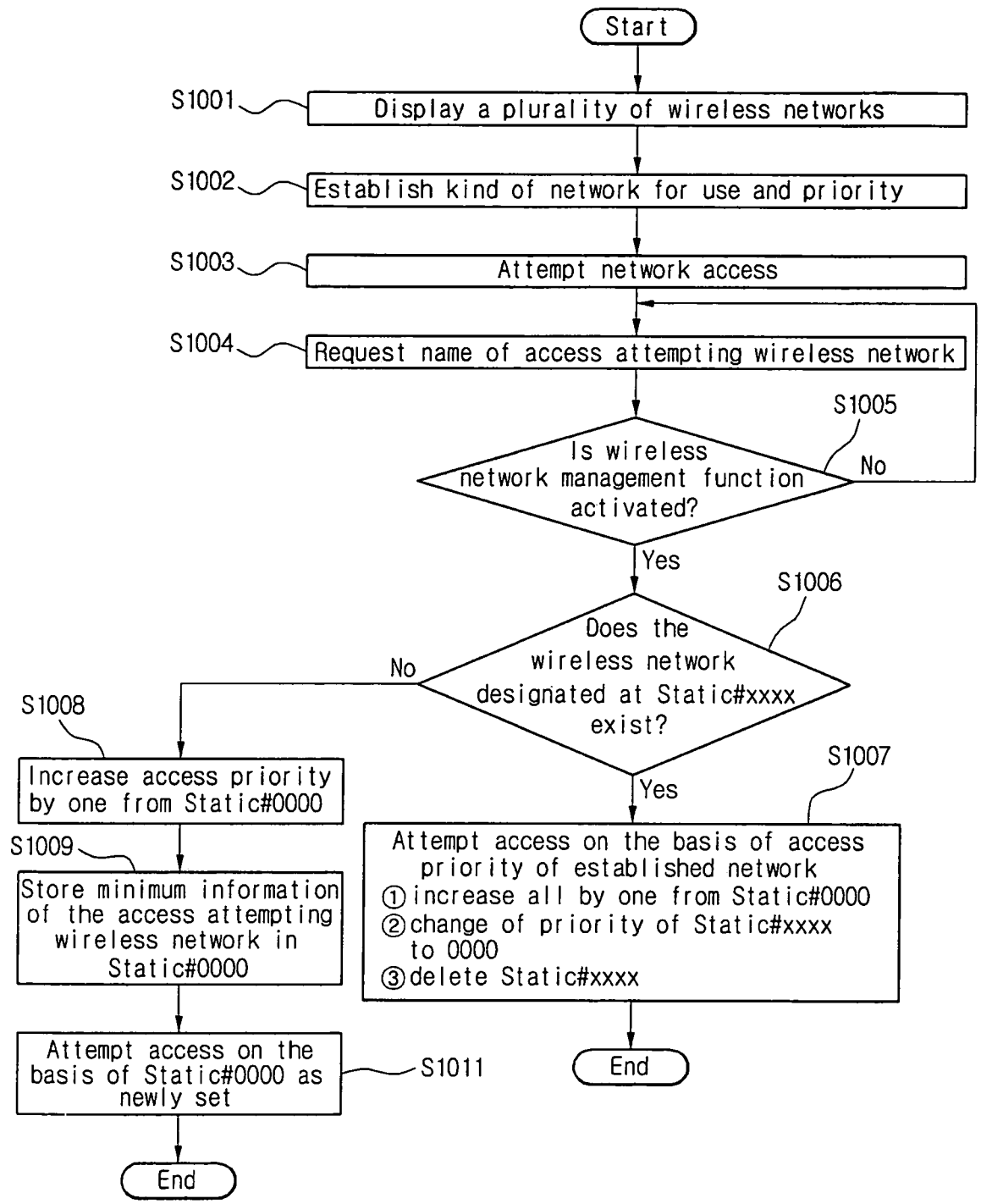
FIG. 10 is a third flow chart illustrating the establishment of an access priority order in the wireless network registry and the operation in accordance with the new wireless network request not included in the registry according to the present invention.

FIG. 10 is a flow chart illustrating the establishment of the access priority order in the wireless network registry and the operation in accordance with the new wireless network request not included in the registry according to the present invention.

As illustrated in FIG. 2, a plurality of usable networks are displayed (S1001).

Among the wireless networks as listed in FIG. 2, a basic access establishment network is listed by the priority order on the basis of a user's establishment/selection as shown in FIG. 3 (S1002).

In the service part or protocol driver, the IM driver as the network driver attempts an access of a requested network (S1003).

In the IM driver, the name of the access attempted network is requested (S1004).

After identifying that the wireless network management function of the WZCSVC is activated (S1005), it is determined whether the access attempted network exists in the network registry (e.g. as Static#XXXX) (S1006).

As a result of the determination above, if the access attempted network does not exist in the registry, the access priority order is increased by 1 from Satic#0000 and on, and then a predetermined minimum information is stored in new Static#0000, so that the newly requested network is set as having the highest priority in the registry and the predetermined information is stored as illustrated in FIG. 4 (S1008, S1009). Then the network access of the requested network is and can be made based on the stored registry information (Static#0000 data) (S1011).

In the service part, the network is operated on the basis of the stored information, and what is the presently accessed network is identified by the network driver. The network driver transmits the fake information having no specific relation with the network listed in the registry, and the remaining information of the presently requested network is stored in the registry in response to the fake signal.

In case where the access requested network exists in the list of FIG. 3 at step S1006, if an original list is different from the newly established order, the access is attempted on the basis of the access priority order newly established through the procedures at step S806 in FIG. 8 (S1007).

As stated above, the present invention is to change the network access attribute to perform the access by the originally established network and by the priority order only in light of the features of the WZCSVC. Therefore, if the presently access-requesting network does not exist in the original established list, the present invention relates to an apparatus, method and computer software for establishing a network using a network interface enabling the access by increasing the existing priority order as established by one and adjusting the presently requested network as having the highest priority in the WZCSVC registry.

Further, upon the request of the network access, the present invention is directed to an apparatus, method and software for establishing a network using a network interface to obtain access by identifying whether a desired network exists in the list of the established networks in the WZCSVC and by changing the establishment of the network or the access priority of the networks in the list.

Therefore, according to the present invention, it is possible to share the control of the WZCSVC and wireless network.

Further, it is possible to establish the network, without any collisions among the networks attempted to access, in the state that the WZCSVC is activated.

Further, it is possible to access a requested network, regardless of the already established network and the access priority order, by modifying the NDIS Intermediate driver as the network drive and the information of the WZCSVC in order to embody the present invention.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of establishing a connection to a wireless network, comprising:
   connecting to one of a plurality of wireless networks according to a predetermined order using information on the plurality of wireless networks;
   receiving a request for a connection to a new wireless network;
   suspending a wireless service in response to the request; and
   processing the request upon the suspension of the wireless service,
   wherein the processing step includes:
   receiving an identification of the new wireless network:
   determining whether or not the identification of the new wireless network exists in a storage: and
   changing a priority order of existing access points stored in the storage if the determining step determines that the identification of the new wireless network exists in the storage, whereby an access point associated with the new wireless network is automatically given a highest priority.

2. The method of claim 1, wherein the processing step further includes:
   lowering a priority order of the existing access points stored in the storage if the determining step determines that the identification of the new wireless network does not exist in the storage.

3. The method of claim 2, wherein if the determining step determines that the identification of the new wireless network does not exist in the storage, the processing step further includes:
   storing certain information from one of the existing access points as a new access point having a highest priority.

4. A method of establishing a connection to a wireless network, comprising:
   connecting to one of a plurality of wireless networks according to a predetermined order using information on the plurality of wireless networks;
   receiving a request for a connection to a new wireless network;

suspending a wireless service in response to the request; and processing the request upon the suspension of the wireless service, wherein the processing step includes:

receiving an identification of the new wireless network;

determining whether or not the identification of the new wireless network exists in a storage;

lowering a priority order of existing access points stored in the storage if the determining step determines that the identification of the new wireless network does not exist in the storage, wherein if the determining step determines that the identification of the new wireless network does not exist in the storage, the processing step further includes:

storing certain information from one of the existing access points as a new access point having a highest priority, and wherein if the determining step determines that the identification of the new wireless network does not exist in the storage, the processing step further includes:

receiving the certain information from the application;

receiving null information; and combining the null information and the certain information to generate connection information for the new wireless network.

5. An apparatus for establishing a connection to a wireless network, comprising:

a wireless service to control connecting to one of a plurality of wireless networks according to a predetermined order using information on the plurality of wireless networks;

a driver to receive a request for a connection to a new wireless network; and an application to suspend a wireless service in response to the request, and to process the request upon the suspension of the wireless service, wherein the application receives an identification of the new wireless network, and determines whether or not the identification of the new wireless network exists in a storage, and wherein the application changes a priority order in existing access points stored in the storage if the identification of the new wireless network exists in the storage, whereby an access point associated with the new wireless network is automatically given a highest priority.

6. The apparatus of claim 5, wherein the application lowers a priority order of the existing access points stored in the storage if the identification of the new wireless network does not exist in the storage.

7. The apparatus of claim 6, wherein the application also stores certain information from one of the existing access points as a new access point having a highest priority if the identification of the new wireless network does not exist in the storage.

8. An apparatus for establishing a connection to a wireless network, comprising:

a wireless service to control connecting to one of a plurality of wireless networks according to a predetermined order using information on the plurality of wireless networks;

a driver to receive a request for a connection to a new wireless network; and an application to suspend a wireless service in response to the request, and to process the request upon the suspension of the wireless service, wherein the application receives an identification of the new wireless network, and determines whether or not the identification of the new wireless network exists in a storage, wherein the application lowers a priority order of existing access points stored in the storage if the identification of the new wireless network does not exist in the storage, wherein the application also stores certain information from one of the existing access points as a new access point having a highest priority if the identification of the new wireless network does not exist in the storage, and wherein the wireless service receives the certain information from the application, receives null information, and combines the null information and the certain information to generate connection information for the new wireless network.

9. A computer program product embodied on at least one computer-readable medium, for establishing a connection to a wireless network, the computer program product comprising:

computer executable code configured to connect to one of a plurality of wireless networks according to a predetermined order using information on the plurality of wireless networks;

computer executable code configured to receive a request for a connection to a new wireless network;

computer executable code configured to suspend a wireless service in response to the request; and computer executable code configured to process the request upon the suspension of the wireless service, wherein the computer executable code configured to process includes:

computer executable code configured to receive an identification of the new wireless network;

computer executable code configured to determine whether or not the identification of the new wireless network exists in a storage; and computer executable code configured to change a priority order of existing access points stored in the storage if it is determined that the identification of the new wireless network exists in the storage, whereby an access point associated with the new wireless network is automatically given the highest priority.

10. The computer program product of claim 9, wherein the computer executable code configured to process further includes:

computer executable code configured to lower a priority order of the existing access points stored in the storage if it is determined that the identification of the new wireless network does not exist in the storage.

11. The computer program product of claim 10, wherein if it is determined that the identification of the new wireless network does not exist in the storage, the computer executable code configured to process further includes:

computer executable code configured to store certain information from one of the existing access points as a new access point having a highest priority.

12. A computer program product embodied on at least one computer-readable medium, for establishing a connection to a wireless network, the computer program product comprising:

computer executable code configured to connect to one of a plurality of wireless networks according to a predetermined order using information on the plurality of wireless network;

computer executable code configured to receive a request for a connection to a new wireless network;

computer executable code configured to suspend a wireless service in response to the request; and computer executable code configured to process the request upon the suspension of the wireless service, wherein the computer executable code configured to process includes:

computer executable code configured to receive an identification of the new wireless network;

computer executable code configured to determine whether or not the identification of the new wireless network exists in a storage; and computer executable code configured to lower a priority order of existing access points stored in the storage if it is determined that the identification of the new wireless network does not exist in the storage, wherein if it is determined that the identification of the new wireless network does not exist in the storage, the computer executable code configured to process further includes:

computer executable code configured to store certain information from one of the existing access points as a new access point having a highest priority, and wherein if it is determined that the identification of the new wireless network does not exist in the storage, the computer executable code configured to process further includes:

computer executable code configured to receive the certain information from the application;

computer executable code configured to receive null information; and computer executable code configured to combine the null information and the certain information to generate connection information for the new wireless network.

13. A system for establishing a connection to a network, comprising:

a plurality of user devices connectable to networks, at least one of the user devices including, a wireless service to control connecting to one of a plurality of wireless networks according to a predetermined order using information on the plurality of wireless networks, a driver to receive a request for a connection to a new wireless network, and an application to suspend a wireless service in response to the request, and to process the request upon the suspension of the wireless service, wherein the application receives an identification of the new wireless network, and determines whether or not the identification of the new wireless network exists in storage, and wherein the application changes a priority order of existing access points stored in the storage if the identification of the new wireless network exists in the storage, whereby an access point associated with the new wireless network is automatically given a highest priority.

14. The system of claim 13, wherein the application lowers a priority order of the existing access points stored in the storage if the identification of the new wireless network does not exist in the storage.

15. The system of claim 14, wherein the application also stores certain information from one of the existing access points as a new access point having a highest priority if the identification of the new wireless network does not exist in the storage.

16. A system for establishing a connection to a network, comprising:

a plurality of user devices connectable to networks, at least one of the user devices including, a wireless service to control connecting to one of a plurality of wireless networks according to a predetermined order using information on the plurality of wireless networks, a driver to receive a request for a connection to a new wireless network, and an application to suspend a wireless service in response to the request, and to process the request upon the suspension of the wireless service, wherein the application receives an identification of the new wireless network, and determines whether or not the identification of the new wireless network exists in storage, wherein the application lowers a priority order of existing access points stored in the storage if the identification of the new wireless network does not exist in the storage, and wherein the application also stores certain information from one of the existing access points as a new access point having a highest priority if the identification of the new wireless network does not exist in the storage, and wherein the wireless service receives the certain information from the application, receives null information, and combines the null information and the certain information to generate connection information for the new wireless network.

* * * * *